(12) United States Patent
Wang et al.

(10) Patent No.: US 12,525,049 B2
(45) Date of Patent: Jan. 13, 2026

(54) PERSON RE-IDENTIFICATION METHOD, COMPUTER-READABLE STORAGE MEDIUM, AND TERMINAL DEVICE

(71) Applicant: UBTECH ROBOTICS CORP LTD, Shenzhen (CN)

(72) Inventors: Kan Wang, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 373 days.

(21) Appl. No.: 18/088,800

(22) Filed: Dec. 27, 2022

(65) Prior Publication Data

US 2023/0386241 A1    Nov. 30, 2023

(30) Foreign Application Priority Data

May 31, 2022   (CN) .......................... 202210611695.1

(51) Int. Cl.
    *G06V 40/10*    (2022.01)
    *G06V 10/74*    (2022.01)
(52) U.S. Cl.
    CPC ............ *G06V 40/10* (2022.01); *G06V 10/761* (2022.01)
(58) Field of Classification Search
    CPC .............................. G06V 40/10; G06V 10/761
    See application file for complete search history.

(56) References Cited

U.S. PATENT DOCUMENTS

2023/0386241 A1* 11/2023 Wang .................. G06V 10/764

FOREIGN PATENT DOCUMENTS

| CN | 108009528 A | * | 12/2017 | |
| CN | 112569657 A | * | 10/2021 | ............ G06N 3/045 |
| CN | 113569657 A | * | 10/2021 | |
| CN | 114863485 A | * | 8/2022 | |

OTHER PUBLICATIONS

Chen, Weihua, et al. "Beyond triplet loss: a deep quadruplet network for person re-identification." Proceedings of the IEEE conference on computer vision and pattern recognition. 2017. (Year: 2017).*
Weihua Chen, Xiaotang Chen, Jianguo Zhang, Kaiqi Huang: Beyond triplet loss: a deep quadruplet network for person re-identification (2016).

(Continued)

*Primary Examiner* — Shaghayegh Azima

(57) ABSTRACT

A person re-identification method, a storage medium, and a terminal device are provided. In the method, a loss function used during model training is a preset distribution-based triplet loss function constraining a difference between a mean of a negative sample feature distance and a mean of a positive sample feature distance to be larger than a preset difference threshold; where the positive sample feature distance is a distance between a feature of a reference image, and a feature of a positive sample image, and the negative sample feature distance is a distance between the feature of the reference image and a feature of a negative sample image. In this manner, it can constrain the mean of the positive sample feature distance and that of the negative sample feature distance, thereby improving the accuracy of person re-identification results.

18 Claims, 5 Drawing Sheets

(56) References Cited

OTHER PUBLICATIONS

Alexander Hermans, Lucas Beyer, and Bastian Leibe: In Defense of the Triplet Loss for Person Re-Identification (2017).
Kihyuk Sohn: Improved Deep Metric Learning with Multi-class N-pair Loss Objective (2016).
Baosheng Yu and Dacheng Tao: Deep Metric Learning with Tuplet Margin Loss (2019).

* cited by examiner

PERSON RE-IDENTIFICATION METHOD, COMPUTER-READABLE STORAGE MEDIUM, AND TERMINAL DEVICE

CROSS REFERENCE TO RELATED APPLICATIONS

The present disclosure claims priority to Chinese Patent Application No. 202210611695.1, filed May 31, 2022, which is hereby incorporated by reference herein as if set forth in its entirety.

BACKGROUND

1. Technical Field

The present disclosure relates to person re-identification technology, and particularly to a person re-identification method, a computer-readable storage medium, and a terminal device.

2. Description of Related Art

Person re-identification is a technology that uses computer vision technology to determine whether there is a specific person in an image or video sequence.

In the process of the development of the person re-identification technology from the traditional metric learning to the deeper and wider deep neural network learning, the measurement of distance is inevitable. The person re-identification technology needs to be able to effectively shorten the distance between the same classes and increase the distance between different classes in the feature space. Based on the measurement of distance, researchers have proposed many loss functions for supervising network learning. Among them, the absolute distance-based triplet loss function is the most widely used loss function, which can achieve better training effect results in general cases.

However, the absolute distance-based triplet loss function does not have a uniform convergence target for different triplets, which leads to the poor discriminative and robustness of the features extracted by the trained model and therefore reduces the accuracy of person re-identification results.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

The loss function is an integral part of a deep network model. During the training of the model, the loss function enhances the feature representation capability of the model by minimizing the error between the predicted value of the model and the true value of that. In vision tasks for fine-grained recognition such as person re-identification, the loss function usually optimizes both the inter-class distance and the intra-class distance so as to enhance the discriminative and robustness of the model.

Figure 1:
FIG. 1 is a schematic diagram of triplet image sets according to an embodiment of the present disclosure.

The triplet loss function is the most common loss function in the vision tasks, which is often used in tasks such as face recognition, image classification, and person re-identification. The input of the triplet loss function is a feature triplet $\{f^a, f^p, f^n\}$, where $f^a$, $f^p$, and $f^n$ are a feature of the reference image, a feature of the positive sample image and a feature of the negative sample image, respectively, in the triplet. The feature of the reference image and the feature of the positive sample image may form a positive sample feature pair, while the feature of the reference image and the feature of the negative sample image may form a negative sample feature pair. FIG. 1 is a schematic diagram of triplet image sets according to an embodiment of the present disclosure. As shown in FIG. 1, the images in each triplet image set (i.e., set of triplet image sets that are generated based on image(s) captured by ono or more cameras), from left to right, are a reference image, a positive sample image, and a negative sample image, respectively.

The above-mentioned absolute distance-based triplet loss function constrains the difference between a negative sample feature distance $D(f^a, f^n)$ and a positive sample feature distance $D(f^a, f^p)$ to be larger than a preset difference threshold, so as to achieve the optimization goal of increasing intra-class similarity and reducing inter-class similarity. In which, the positive sample feature distance is a distance between a feature of the reference image and a feature of the positive sample image, and the negative sample feature distance is a distance between the feature of the reference image and a feature of the negative sample image.

The absolute distance-based triplet loss function may be as an equation of:

$$L_{triplet} = \frac{1}{N_{tp}} \sum_{i=1}^{N_{tp}} \{D(f_i^a, f_i^p) - D(f_i^a, f_i^n) + \alpha\}_+ ;$$

where, $N_{tp}$ is a number of triples, i is a serial number, D is a function for calculating distance, $\alpha$ is the difference threshold, $\{*\}_+ = \max\{*, 0\}$, max is a function for calculating maximum value, and $L_{triplet}$ is the absolute distance-based triplet loss function.

In model training, the computational complexity of using all triples to train the model is $O(N^3)$, where N is the number of images in a training dataset. Therefore, in order to improve the training efficiency of the model, the set of triples are often selected by using the strategy of hard negative mining. As shown below, under the strategy of hard negative mining, the absolute distance-based triplet loss function may be as an equation of:

$$L_{triplet} = \frac{1}{N_{tp}} \sum_{i=1}^{P} \sum_{a=1}^{A} \left\{ \max_{\substack{p=1 \ldots A}} D(f_i^a, f_i^p) - \min_{\substack{n=1 \ldots A \\ j=1 \ldots P \\ j \neq i}} D(f_i^a, f_j^n) + \alpha \right\}_+ ;$$

where, min is a function for calculating minimum value, j is a serial number, and P and A are a number of pedestrians in a training batch of the model and a number of images of each person to be re-identified, respectively.

Due to the absolute distance-based triplet loss function only constrains the difference between the negative sample feature distance and the positive sample feature distance, rather than constraining the image feature itself, and randomness is inevitably introduced when constructing a batch of training data, deviations of the decision boundary of the feature triple optimized by the absolute distance-based triplet loss function will be caused.

For example, when the value of $\alpha$ is set to 0.4, for the triplet image sets in parts (a) and (b) of FIG. 1, due to their larger inter-class similarity and intra-class similarity, the values of the negative sample feature distance and positive sample feature distance of the triplet after completing model training may be 0.5 and 0.1, respectively, and the decision boundary of the triple may be 0.4; while for the triplet image sets in parts (c) and (d) of FIG. 1, due to their smaller inter-class similarity, the values of the negative sample feature distance and positive sample feature distance of the triplet after completing model training may be 0.9 and 0.3, respectively, and the decision boundary of the triple may be 0.6. This means that even though all the triplets satisfy the constraints of the loss function, their decision boundaries will be significantly different. The root cause of the forgoing phenomenon is that the existing absolute distance-based triplet loss function only constraints the feature triplets alone, and does not directly constrain the image features, which results in inconsistent convergence targets for different triplets.

In comparison with the existing absolute distance-based triplet loss function that increases the inter-class distance and reduces the intra-class distance by individually constraining each triplet, the distribution-based triplet loss function provided by the embodiment of the present disclosure achieves the similar function in a macroscopic perspective of the distribution of feature points. In short, the distribution-based triplet loss function may include a macroscopic constraint function that constrains a difference between a mean of a negative sample feature distance and a mean of a positive sample feature distance to be larger than a preset difference threshold, as an equation of:

$$L_{macro} = \left\{ \sum_{i=1}^{N_{op}} D(f_i^a, f_i^p) - \sum_{j=1}^{N_{an}} D(f_j^a, f_j^n) + \alpha \right\}_+ ;$$

where, $N_{ap}$ is a number of positive sample feature pairs, $N_{an}$ is a number of negative sample feature pairs, and $L_{macro}$ is the macroscopic constraint function.

Compared with the existing absolute distance-based triplet loss function, the macroscopic constraint function $L_{macro}$ has the following two advantages. First, the macroscopic constraint function has computational complexity. The absolute distance-based triplet loss function $L_{triplet}$ needs to calculate the loss of all triplets, but the macroscopic constraint function $L_{macro}$ only needs to calculate the loss of one triplet and the means of each of two kinds of features. Second, the macroscopic constraint function $L_{triplet}$ constraints each triplet while the sampling of triplets is random. However, the macroscopic constraint function $L_{macro}$ only constraints the means of the positive sample feature pair and negative sample feature pair, so its constraints are more stable.

Figure 2:
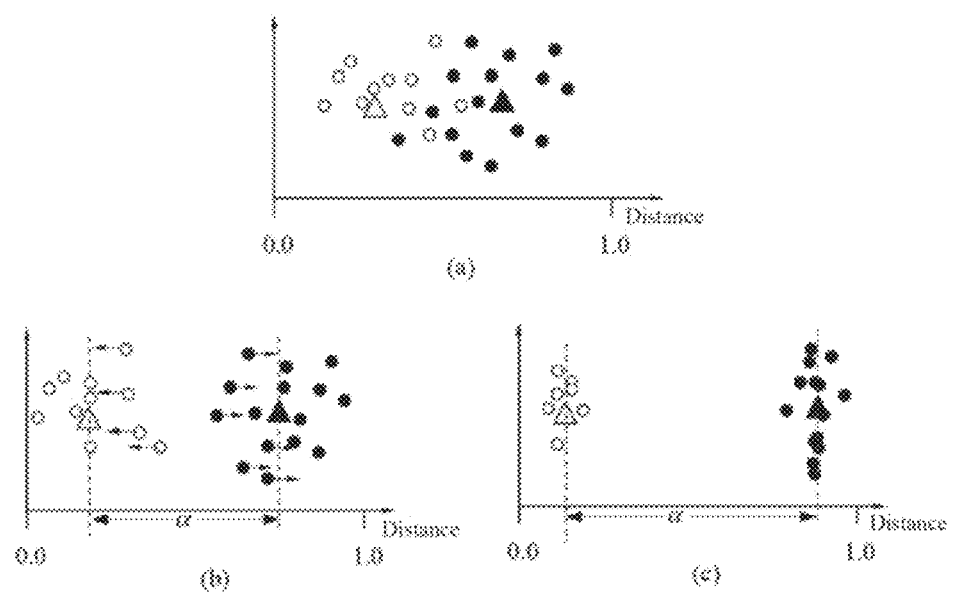
FIG. 2 is a schematic diagram of the distribution of positive sample feature pairs and negative sample feature pairs according to an embodiment of the present disclosure.

FIG. 2 is a schematic diagram of the distribution of positive sample feature pairs and negative sample feature pairs according to an embodiment of the present disclosure. Part (a) of FIG. 2 is the distribution of positive sample feature pairs and negative sample feature pairs after constraining by the absolute distance-based triplet loss function, and part (b) of FIG. 2 is the distribution of positive sample feature pairs and negative sample feature pairs after imposing the macroscopic constraint. In which, white circles and black circles represent positive sample feature pairs and negative sample feature pairs, respectively, white triangles and black triangles represent the mean of positive sample feature pairs and that of negative sample feature pairs, respectively, and the arrows are the optimization directions. It can be seen from the figure that the macroscopic constraint can widen the distance between the positive sample feature pairs and the negative sample feature pairs, but the distributions of the positive sample feature pairs and negative sample feature pairs are still loose, which leads to the issue of the inconsistent convergence of intra-class distance and inter-class distance.

Considering the above-mentioned shortcomings of the macroscopic constraint, in the embodiments of the present disclosure, a constraint from a microscopic perspective that is complementary to the macroscopic constraint is further provided as equations of:

$$L_{mirco}^{ap} = \frac{1}{N_{ap}^{act}}\left\{\sum_{i=1}^{N_{ap}^{act}}\left(D(f_i^a, f_i^p) - \sum_{j=1}^{N_{ap}}D(f_j^a, f_j^p)\right)\right\}_+;$$

$$L_{micro}^{an} = \frac{1}{N_{an}^{act}}\left\{\sum_{i=1}^{N_{an}^{act}}\left(\sum_{j=1}^{N_{an}}D(f_j^a, f_j^n) - D(f_i^a, f_i^n)\right)\right\}_+;$$

where, $N_{ap}$ is the number of the positive sample feature pairs, $N_{ap}^{act}$ is the number of the positive sample feature pairs that have a distance larger than the mean of the positive sample feature distance, $N_{an}$ is the number of the negative sample feature pairs, $N_{an}^{act}$ is the number of the negative sample feature pairs that have a distance smaller than the mean of the negative sample feature distance, $L_{micro}^{ap}$ is a positive sample microscopic constraint function, and $L_{micro}^{an}$ is a negative sample microscopic constraint function.

A first feature distance is constrained to be reduced to the mean of the positive sample feature distance by the positive sample microscopic constraint function $L_{micro}^{ap}$, where the first feature distance is the positive sample feature distance larger than the mean of the positive sample feature distance. Those positive sample feature distances that are less than or equal to the mean of the positive sample feature distance are not constrained. Correspondingly, a second feature distance is constrained to be increased to the mean of the negative sample feature distance by the positive sample microscopic constraint function $L_{micro}^{ap}$, where the second feature distance is the negative sample feature distance smaller than the mean of the negative sample feature distance. Those negative sample feature distances that are larger than or equal to the mean of the negative sample feature distance are not constrained.

The positive sample microscopic constraint function $L_{micro}^{ap}$ implicitly requires that all positive sample feature pairs have similar distances. Correspondingly, the negative sample microscopic constraint function $L_{micro}^{an}$ implicitly requires that all negative sample feature pairs have similar distances. In this way, the convergence targets of all the positive sample feature pairs can be consistent, and the convergence targets of all the negative sample feature pairs can be also consistent.

In one embodiment, the macroscopic constraint function, the positive sample microscopic constraint function, and the negative sample microscopic constraint function may be comprehensively considered in the distribution-based triplet loss function as an equation of:

$$L_{triplet\_distribution} = L_{macro} + \lambda(L_{micro}^{ap} + L_{micro}^{an});$$

where, $\lambda$ is a preset weight coefficient, and its value may be set according to actual needs and will not be limited herein, and $L_{triplet\_distribution}$ is the distribution-based triplet loss function.

Part (c) of FIG. 2 is the distribution of positive sample feature pairs and negative sample feature pairs after imposing the macroscopic constraint and the microscopic constraints at the same time. It can be seen from the figure that the macroscopic constraint can widen the distance between the positive sample feature pairs and the negative sample feature pairs, while the micro constraint can make the distribution more compact, and at the same time continue to increase the distance between the positive sample feature pairs and the negative sample feature pairs.

During the training of the person re-identification model, the above-mentioned distribution-based triplet loss function can be used to obtain a person re-identification model that is more discriminative and robust to image features.

Figure 3:
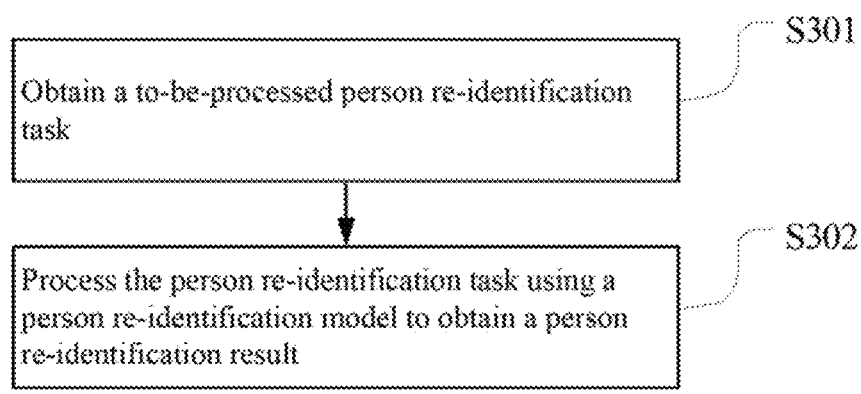
FIG. 3 is a flow chart of a person re-identification method according to an embodiment of the present disclosure.

After obtaining the person re-identification model, it can be applied to an actual person re-identification task. FIG. 3 is a flow chart of a person re-identification method according to an embodiment of the present disclosure. In this embodiment, the person re-identification method is a computer-implemented method executable for (a processor of) a terminal device (e.g., a webcam and a mobile phone) having a camera (e.g., camera 53 of a terminal device 5 shown in FIG. 5). In other embodiments, the method may be implemented through a person re-identification apparatus shown in FIG. 4 or the terminal device 5 shown in FIG. 5. As shown in FIG. 3, in this embodiment, the person re-identification method may include the following steps.

S301: obtaining, from the terminal device, a to-be-processed person re-identification task.

S302: processing the person re-identification task using a preset person re-identification model to obtain a person re-identification result In summary, in this embodiment, the loss function used during model training is the distribution-based triplet loss function that is set in advance. The distribution-based triplet loss function constrains a difference between a mean of a negative sample feature distance and a mean of a positive sample feature distance to be larger than a preset difference threshold, where the positive sample feature distance is a distance between a feature of a reference image, and a feature of a positive sample image, and the negative sample feature distance is a distance between the feature of the reference image and a feature of a negative sample image. In this manner, by constraining the mean of the positive sample feature distance and that of the negative sample feature distance that have macro-statistical significance instead of constraining each triplet separately, it effectively avoids the disadvantage of the existing absolute distance-based triplet loss function that does not have a uniform convergence target for different triplets so that the features extracted by the trained model are more discriminative and robust, thereby improving the accuracy of person re-identification results.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 4:
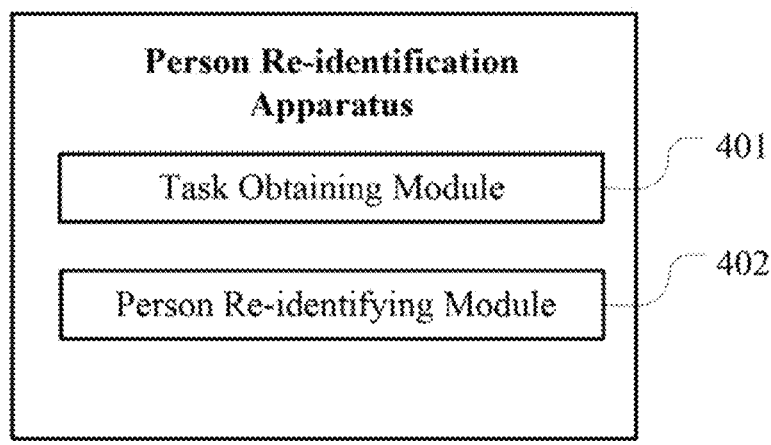
FIG. 4 is a schematic block diagram of a person re-identification apparatus according to an embodiment of the present disclosure.

FIG. 4 is a schematic block diagram of a person re-identification apparatus according to an embodiment of the present disclosure. A person re-identification apparatus corresponding to the person re-identification method described in the above embodiment is provided. The person re-identification apparatus (e.g., the terminal device 5 shown in FIG. 5) may be, for example, a webcam, a mobile phone, or the like that has a camera.

In this embodiment, the person re-identification apparatus may include:
- a task obtaining module 401 configured to obtain, from the terminal device, a pending person re-identification task executed by the processor of the terminal device; and
- a person re-identifying module 402 configured to process the person re-identification task using a preset person re-identification model to obtain a person re-identification result; wherein, a loss function used by the person re-identification model during training the person re-identification model is a preset distribution-based triplet loss function constraining a difference between a mean of a negative sample feature distance and a mean of a positive sample feature distance to be larger than a preset difference threshold; wherein the positive sample feature distance is a distance between a feature of a reference image captured by the camera of the terminal device and a feature of a positive sample image captured by the camera of the terminal device, and the negative sample feature distance is a distance between the feature of the reference image and a feature of a negative sample image captured by the camera of the terminal device.

In one embodiment, the distribution-based triplet loss may function further constrain a first feature distance to be reduced to the mean of the positive sample feature distance and constrains a second feature distance to be increased to the mean of the negative sample feature distance; where the first feature distance is the positive sample feature distance larger than the mean of the positive sample feature distance, and the second feature distance is the negative sample feature distance smaller than the mean of the negative sample feature distance.

In one embodiment, the distribution-based triple loss function may include a macroscopic constraint function, a positive sample microscopic constraint function, and a negative sample microscopic constraint function; where:
- the macroscopic constraint function is for constraining the difference between the mean of the negative sample feature distance and the mean of the positive sample feature distance to be larger than the difference threshold;
- the positive sample micro constraint function is for constraining the first feature distance to be reduced to the mean of the positive sample feature distance; and
- the negative sample microcosmic constraint function is for constraining the second feature distance to be increased to the mean of the negative sample feature distance.

In one embodiment, the distribution-based triplet loss function may be as an equation of:

$$L_{triplet\_distribution} = L_{macro} + \lambda(L_{micro}^{ap} + L_{micro}^{an});$$

where, $L_{macro}$ is the macroscopic constraint function, $L_{micro}^{ap}$ is the positive sample microscopic constraint function, $L_{micro}^{an}$ is the negative sample microscopic constraint function, $\lambda$ is a preset weight coefficient, and $L_{triplet\_distribution}$ is the distribution-based triplet loss function.

In one embodiment, the macroscopic constraint function may be as an equation of:

$$L_{macro} = \left\{ \sum_{i=1}^{N_{ap}} D(f_i^a, f_i^p) - \sum_{j=1}^{N_{an}} D(f_j^a, f_j^n) + \alpha \right\}_+ ;$$

where, $N_{ap}$ is a number of positive sample feature pairs, $N_{an}$ is a number of negative sample feature pairs, i and j are serial number subscripts, $f^a$, $f^p$, and $f^n$ are the feature of the reference image, the feature of the positive sample image, and the feature of the negative sample image, respectively, D is a function for calculating distance, a is the difference threshold, $\{*\}_+ = \max\{*, 0\}$, and max is a function for calculating maximum value.

In one embodiment, the positive sample microscopic constraint function may be as an equation of:

$$L_{micro}^{ap} = \frac{1}{N_{ap}^{act}} \left\{ \sum_{i=1}^{N_{ap}^{act}} \left( D(f_i^a, f_i^p) - \sum_{j=1}^{N_{ap}} D(f_j^a, f_j^p) \right) \right\}_+ ;$$

where, $N_{ap}$ is a number of positive sample feature pairs, $N_{ap}^{act}$ is a number of the positive sample feature pairs that have a distance larger than the mean of the positive sample feature distance, i and j are serial number subscripts, $f^a$, $f^p$, and $f^n$ are the feature of the reference image, the feature of the positive sample image, and the feature of the negative sample image, respectively, D is a function for calculating distance, a is the difference threshold, $\{*\}_+ = \max\{*, 0\}$, and max is a function for calculating maximum value.

In one embodiment, the negative sample microscopic constraint function is as an equation of:

$$L_{micro}^{an} = \frac{1}{N_{an}^{act}} \left\{ \sum_{i=1}^{N_{an}^{act}} \left( \sum_{j=1}^{N_{an}} D(f_j^a, f_j^n) - D(f_i^a, f_i^n) \right) \right\}_+ ;$$

where, $N_{an}$ is a number of negative sample feature pairs, $N_{an}^{act}$ is a number of the negative sample feature pairs that have a distance smaller than the mean of the negative sample feature distance, i and j are serial number subscripts, $f^a$, $f^p$, and $f^n$ are the feature of the reference image, the feature of the positive sample image, and the feature of the negative sample image, respectively, D is a function for calculating distance, a is the difference threshold, $\{*\}_+ = \max\{*, 0\}$, and max is a function for calculating maximum value.

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Figure 5:
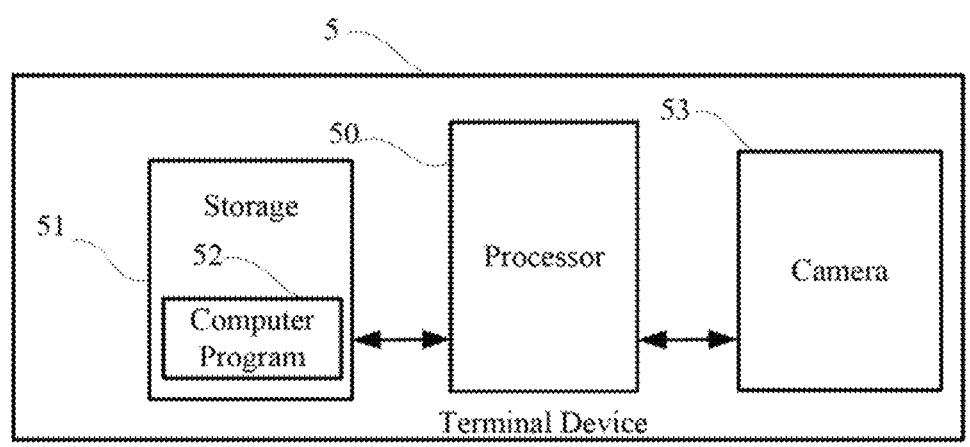
FIG. 5 is a schematic block diagram of a terminal device according to an embodiment of the present disclosure.

FIG. 5 is a schematic block diagram of a terminal device according to an embodiment of the present disclosure. A terminal device 5, for example, a webcam, a mobile phone, or the like, is provided. For convenience of description, only parts related to this embodiment are shown.

As shown in FIG. 5, in this embodiment, the terminal device 5 may include a processor 50, a storage 51, a computer program 52 stored in the storage 51 and executable on the processor 50, and a camera 53. When executing (instructions in) the computer program 52, the processor 50 implements the steps in the above-mentioned embodiments of the person re-identification method, for example, steps S301-S302 shown in FIG. 3. Alternatively, when the processor 50 executes the (instructions in) computer program 52, the functions of each module/unit in the above-mentioned device embodiments, for example, the functions of the modules 401-402 shown in FIG. 4 are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the terminal device 5.

The terminal device 5 may be a computing device such as a mobile phone, a tablet computer, a desktop computer, a notebook computer, a pocket personal computer, and a terminal equipment. It can be understood by those skilled in the art that FIG. 5 is merely an example of the terminal device 5 and does not constitute a limitation on the terminal device 5, and may include more or fewer components than those shown in the figure, or a combination of some components or different components. For example, the terminal device 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the terminal device 5, for example, a hard disk or a memory of the terminal device 5. The storage 51 may also be an external storage device of the terminal device 5, for example, a plug-in hard disk, a smart media card (SMC), a secure digital (SD) card, flash card, and the like, which is equipped on the terminal device 5. Furthermore, the storage 51 may further include both an internal storage unit and an external storage device, of the terminal device 5. The storage 51 is configured to store the computer program 52 and other programs and data required by the terminal device 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented person re-identification method for a terminal device having a camera, wherein the terminal device comprises an output device and a processor electrically coupled to the output device and the camera, and the method comprises:
   obtaining, through the camera, an image or a video sequence;
   obtaining, through the processor from the terminal device, a person re-identification task;
   processing, through the processor, the person re-identification task using a preset person re-identification model to determine whether there is a person in the image or the video sequence, wherein the person is a target of identification specified by the person re-identification task; and
   obtaining, through the processor, a person re-identification result, and outputting, through the output device, the person re-identification result;
   wherein, a loss function used by the person re-identification model during training the person re-identification model is a preset distribution-based triplet loss function constraining a difference between a mean of a negative sample feature distance and a mean of a positive sample feature distance to be larger than a preset difference threshold; wherein the positive sample feature distance is a distance between a feature of a reference image captured by the camera of the terminal device and a feature of a positive sample image captured by the camera of the terminal device, and the negative sample feature distance is a distance between the feature of the reference image and a feature of a negative sample image captured by the camera of the terminal device; and
   wherein the distribution-based triplet loss function further constrains a first feature distance to be reduced to the mean of the positive sample feature distance and constrains a second feature distance to be increased to the mean of the negative sample feature distance; wherein the first feature distance is the positive sample feature distance larger than the mean of the positive sample feature distance, and the second feature distance is the negative sample feature distance smaller than the mean of the negative sample feature distance.

2. The method of claim 1, wherein the distribution-based triple loss function includes a macroscopic constraint function, a positive sample microscopic constraint function, and a negative sample microscopic constraint function; wherein the macroscopic constraint function is for constraining the difference between the mean of the negative sample feature distance and the mean of the positive sample feature distance to be larger than the difference threshold; wherein the positive sample micro constraint function is for constraining the first feature distance to be reduced to the mean of the positive sample feature distance, and the negative sample microcosmic constraint function is for constraining the second feature distance to be increased to the mean of the negative sample feature distance.

3. The method of claim 2, wherein the distribution-based triplet loss function is as an equation of:

$$L_{triplet\_distribution}=L_{macro}+\lambda(L_{micro}^{ap}+L_{micro}^{an});$$

where, $L_{macro}$ is the macroscopic constraint function, $L_{micro}^{ap}$ is the positive sample microscopic constraint function, $L_{micro}^{an}$ is the negative sample microscopic constraint function, $\lambda$ is a preset weight coefficient, and $L_{triplet\_distribution}$ is the distribution-based triplet loss function.

4. The method of claim 3, wherein the macroscopic constraint function is as an equation of:

$$L_{macro} = \left\{\sum_{i=1}^{N_{op}} D(f_i^a, f_i^p) - \sum_{j=1}^{N_{an}} D(f_j^a, f_j^n) + \alpha\right\}_+;$$

where, $N_{ap}$ is a number of positive sample feature pairs, $N_{an}$ is a number of negative sample feature pairs, i and j are serial numbers, $f^a$, $f^p$, and $f^n$ are the feature of the reference image, the feature of the positive sample image, and the feature of the negative sample image, respectively, D is a function for calculating distance, $\alpha$ is the difference threshold, $\{*\}_+=\max\{*,0\}$, and max is a function for calculating maximum value.

5. The method of claim 3, wherein the positive sample microscopic constraint function is as an equation of:

$$L_{mirco}^{ap} = \frac{1}{N_{ap}^{act}}\left\{\sum_{i=1}^{N_{ap}^{act}}\left(D(f_i^a, f_i^p) - \sum_{j=1}^{N_{ap}} D(f_j^a, f_j^p)\right)\right\}_+;$$

where, $N_{ap}$ is a number of positive sample feature pairs, $N_{ap}^{act}$ is a number of the positive sample feature pairs that have a distance larger than the mean of the positive sample feature distance, i and j are serial numbers, $f^a$, $f_p$, and $f^n$ are the feature of the reference image, the feature of the positive sample image, and the feature of the negative sample image, respectively, D is a function for calculating distance, $\alpha$ is the difference threshold, $\{*\}^+=\max\{*,0\}$, and max is a function for calculating maximum value.

6. The method of claim 3, wherein the negative sample microscopic constraint function is as an equation of:

$$L_{micro}^{an} = \frac{1}{N_{an}^{act}}\left\{\sum_{i=1}^{N_{an}^{act}}\left(\sum_{j=1}^{N_{an}} D(f_j^a, f_j^n) - D(f_i^a, f_i^n)\right)\right\}_+;$$

where, $N_{an}$ is a number of negative sample feature pairs, $N_{an}^{act}$ is a number of the negative sample feature pairs that have a distance smaller than the mean of the negative sample feature distance, i and j are serial numbers, $f^a$, $f^p$, and $f^n$ are the feature of the reference image, the feature of the positive sample image, and the feature of the negative sample image, respectively, D is a function for calculating distance, α is the difference threshold, $\{*\}_+ = \max\{*, 0\}$, and max is a function for calculating maximum value.

7. A non-transitory computer-readable storage medium for storing one or more computer programs executable on a processor of a terminal device having a camera, wherein the terminal device further comprises an output device, and the one or more computer programs comprise:

instructions for obtaining, through the camera, an image or a video sequence;

instructions for obtaining, from the terminal device, a person re-identification task;

instructions for processing the person re-identification task using a preset person re-identification model to determine whether there is a person in the image or the video sequence, wherein the person is a target of identification specified by the person re-identification task; and instructions for obtaining a person re-identification result, and outputting, through the output device, the person re-identification result;

wherein, a loss function used by the person re-identification model during training the person re-identification model is a preset distribution-based triplet loss function constraining a difference between a mean of a negative sample feature distance and a mean of a positive sample feature distance to be larger than a preset difference threshold; wherein the positive sample feature distance is a distance between a feature of a reference image captured by a camera of the terminal device and a feature of a positive sample image captured by the camera of the terminal device, and the negative sample feature distance is a distance between the feature of the reference image and a feature of a negative sample image captured by the camera of the terminal device; and wherein the distribution-based triplet loss function further constrains a first feature distance to be reduced to the mean of the positive sample feature distance and constrains a second feature distance to be increased to the mean of the negative sample feature distance; wherein the first feature distance is the positive sample feature distance larger than the mean of the positive sample feature distance, and the second feature distance is the negative sample feature distance smaller than the mean of the negative sample feature distance.

8. The storage medium of claim 7, wherein the distribution-based triple loss function includes a macroscopic constraint function, a positive sample microscopic constraint function, and a negative sample microscopic constraint function; wherein the macroscopic constraint function is for constraining the difference between the mean of the negative sample feature distance and the mean of the positive sample feature distance to be larger than the difference threshold; wherein the positive sample micro constraint function is for constraining the first feature distance to be reduced to the mean of the positive sample feature distance, and the negative sample microcosmic constraint function is for constraining the second feature distance to be increased to the mean of the negative sample feature distance.

9. The storage medium of claim 8, wherein the distribution-based triplet loss function is as an equation of:

$$L_{triplet\_distribution} = L_{macro} + \lambda(L_{micro}^{ap} + L_{micro}^{an});$$

where, $L_{macro}$ is the macroscopic constraint function, $L_{micro}^{ap}$ is the positive sample microscopic constraint function, $L_{micro}^{an}$ is the negative sample microscopic constraint function, λ is a preset weight coefficient, and $L_{triplet\_distribution}$ is the distribution-based triplet loss function.

10. The storage medium of claim 9, wherein the macroscopic constraint function is as an equation of:

$$L_{macro} = \left\{\sum_{i=1}^{N_{ap}} D(f_i^a, f_i^p) - \sum_{j=1}^{N_{an}} D(f_j^a, f_j^n) + \alpha\right\}_+;$$

where, $N_{ap}$ is a number of positive sample feature pairs, $N_{an}$ is a number of negative sample feature pairs, i and j are serial number, $f^a$, $f^p$, and $f^n$ are the feature of the reference image, the feature of the positive sample image, and the feature of the negative sample image, respectively, D is a function for calculating distance, α is the difference threshold, $\{*\}^+ = \max\{*, 0\}$, and max is a function for calculating maximum value.

11. The storage medium of claim 9, wherein the positive sample microscopic constraint function is as an equation of:

$$L_{mirco}^{ap} = \frac{1}{N_{ap}^{act}}\left\{\sum_{i=1}^{N_{ap}^{act}}\left(D(f_i^a, f_i^p) - \sum_{j=1}^{N_{ap}} D(f_j^a, f_j^p)\right)\right\}_+;$$

where, $N_{ap}$ is a number of positive sample feature pairs, $N_{ap}^{act}$ is a number of the positive sample feature pairs that have a distance larger than the mean of the positive sample feature distance, i and j are serial number s, $f^a$, $f^p$, and $f^n$ are the feature of the reference image, the feature of the positive sample image, and the feature of the negative sample image, respectively, D is a function for calculating distance, α is the difference threshold, $\{*\}_+ = \max\{*, 0\}$, and max is a function for calculating maximum value.

12. A terminal device, comprising:
a processor;
a camera electrically coupled to the processor;
an output device electrically coupled to the processor;
a memory coupled to the processor; and
one or more computer programs stored in the memory and executable on the processor;
wherein, the one or more computer programs comprise:
instructions for obtaining, through the camera, an image or a video sequence;
instructions for obtaining, from the terminal device, a person re-identification task;
instructions for processing the person re-identification task using a preset person re-identification model to determine whether there is a person in the image or the video sequence, wherein the person is a target of identification specified by the person re-identification task; and
instructions for obtaining a person re-identification result, and outputting, through the output device, the person re-identification result;
wherein, a loss function used by the person re-identification model during training the person re-identification model is a preset distribution-based triplet loss function constraining a difference between a mean of a negative sample feature distance and a mean of a positive sample feature distance to be larger than a preset difference threshold; wherein the positive sample feature distance is a distance between a feature of a reference image captured by the camera of the terminal device and a feature of a positive sample image captured by the camera of the terminal device, and the negative sample feature distance is a distance between the feature of the reference image and a feature of a negative sample image captured by the camera of the terminal device; and wherein the distribution-based triplet loss function further constrains a first feature distance to be reduced to the mean of the positive sample feature distance and constrains a second feature distance to be increased to the mean of the negative sample feature distance; wherein the first feature distance is the positive sample feature distance larger than the mean of the positive sample feature distance, and the second feature distance is the negative sample feature distance smaller than the mean of the negative sample feature distance.

13. The terminal device of claim 12, wherein the distribution-based triple loss function includes a macroscopic constraint function, a positive sample microscopic constraint function, and a negative sample microscopic constraint function; wherein the macroscopic constraint function is for constraining the difference between the mean of the negative sample feature distance and the mean of the positive sample feature distance to be larger than the difference threshold; wherein the positive sample micro constraint function is for constraining the first feature distance to be reduced to the mean of the positive sample feature distance, and the negative sample microcosmic constraint function is for constraining the second feature distance to be increased to the mean of the negative sample feature distance.

14. The terminal device of claim 13, wherein the distribution-based triplet loss function is as an equation of:

$$L_{triplet\_distribution} = L_{macro} + \lambda(L_{micro}^{ap} + L_{micro}^{an});$$

where, $L_{macro}$ is the macroscopic constraint function, $L_{micro}^{ap}$ is the positive sample microscopic constraint function, $L_{micro}^{an}$ is the negative sample microscopic constraint function, $\lambda$ is a preset weight coefficient, and $L_{triplet\_distribution}$ is the distribution-based triplet loss function.

15. The terminal device of claim 14, wherein the macroscopic constraint function is as an equation of:

$$L_{macro} = \left\{ \sum_{i=1}^{N_{ap}} D(f_i^a, f_i^p) - \sum_{j=1}^{N_{an}} D(f_j^a, f_j^n) + \alpha \right\}_+ ;$$

where, $N_{ap}$ is a number of positive sample feature pairs, $N_{an}$ is a number of negative sample feature pairs, i and j are serial number, $f^a$, $f^p$, and $f^n$ are the feature of the reference image, the feature of the positive sample image, and the feature of the negative sample image, respectively, D is a function for calculating distance, $\alpha$ is the difference threshold, $\{*\}_+=\max\{*, 0\}$, and max is a function for calculating maximum value.

16. The terminal device of claim 14, wherein the positive sample microscopic constraint function is as an equation of:

$$L_{mirco}^{ap} = \frac{1}{N_{ap}^{act}} \left\{ \sum_{i=1}^{N_{ap}^{act}} \left( D(f_i^a, f_i^p) - \sum_{j=1}^{N_{ap}} D(f_j^a, f_j^p) \right) \right\}_+ ;$$

where, $N_{ap}$ is a number of positive sample feature pairs, $N_{ap}^{act}$ is a number of the positive sample feature pairs that have a distance larger than the mean of the positive sample feature distance, i and j are serial number s, $f^a$, $f^p$, and $f^n$ are the feature of the reference image, the feature of the positive sample image, and the feature of the negative sample image, respectively, D is a function for calculating distance, $\alpha$ is the difference threshold, $\{*\}_+=\max\{*, 0\}$, and max is a function for calculating maximum value.

17. The terminal device of claim 14, wherein the negative sample microscopic constraint function is as an equation of:

$$L_{micro}^{an} = \frac{1}{N_{an}^{act}} \left\{ \sum_{i=1}^{N_{an}^{act}} \left( \sum_{j=1}^{N_{an}} D(f_j^a, f_j^n) - D(f_i^a, f_i^n) \right) \right\}_+ ;$$

where, $N_{an}$ is a number of negative sample feature pairs, $N_{an}^{act}$ is a number of the negative sample feature pairs that have a distance smaller than the mean of the negative sample feature distance, i and j are serial number, $f^a$, $f^p$, and $f^n$ are the feature of the reference image, the feature of the positive sample image, and the feature of the negative sample image, respectively, D is a function for calculating distance, $\alpha$ is the difference threshold, $\{*\}_+=\max\{*, 0\}$, and max is a function for calculating maximum value.

18. The storage medium of claim 9, wherein the negative sample microscopic constraint function is as an equation of:

$$L_{micro}^{an} = \frac{1}{N_{an}^{act}} \left\{ \sum_{i=1}^{N_{an}^{act}} \left( \sum_{j=1}^{N_{an}} D(f_j^a, f_j^n) - D(f_i^a, f_i^n) \right) \right\}_+ ;$$

where, $N_{an}$ is a number of negative sample feature pairs, $N_{an}^{act}$ is a number of the negative sample feature pairs that have a distance smaller than the mean of the negative sample feature distance, i and j are serial number, $f^a$, $f^p$, and $f^n$ are the feature of the reference image, the feature of the positive sample image, and the feature of the negative sample image, respectively, D is a function for calculating distance, $\alpha$ is the difference threshold, $\{*\}_+=\max\{*, 0\}$, and max is a function for calculating maximum value.

* * * * *